United States Patent
Gullner

[19]
[11] Patent Number: 5,854,969
[45] Date of Patent: Dec. 29, 1998

[54] STEREO APPARATUS THAT INCLUDES A MASTER UNIT AND A SLAVE UNIT

[75] Inventor: Sven-Åke Gullner, Västra Frölunda, Sweden

[73] Assignee: AB Volvo, Göteborg, Sweden

[21] Appl. No.: 602,827

[22] PCT Filed: Aug. 25, 1994

[86] PCT No.: PCT/SE94/00785

§ 371 Date: Feb. 23, 1996

§ 102(e) Date: Feb. 23, 1996

[87] PCT Pub. No.: WO95/06360

PCT Pub. Date: Mar. 2, 1995

[30] Foreign Application Priority Data

Aug. 25, 1993 [SE] Sweden ................................ 9302741

[51] Int. Cl.⁶ ........................................................ H04B 1/06
[52] U.S. Cl. ............................................ 455/68; 455/345
[58] Field of Search .................................. 455/66, 89, 127, 455/131, 280, 293, 345, 68, 78, 88, 575, 347, 351

[56] References Cited

U.S. PATENT DOCUMENTS 4,521,232  6/1985  Sakurai .
4,907,291  3/1990  Yamamoto ................................. 455/78
4,910,796  3/1990  Nakase et al. .
5,276,918  1/1994  Cornforth et al. ................... 455/127 X

FOREIGN PATENT DOCUMENTS 0 057 892   8/1982  European Pat. Off. .
  318829  12/1988  Japan ....................................... 455/88

*Primary Examiner*—Thanh Cong Le
*Attorney, Agent, or Firm*—Burns, Doane, Swecker & Mathis, L.L.P.

[57] ABSTRACT

An apparatus for providing sound in vehicles which comprises a receiver for radio frequency waves with frequency selection and antenna. The apparatus includes a master unit located in the vehicle close to the driver's seat including loud-speakers. The apparatus also includes a slave unit which is located together with the antenna remotely from the master unit. The slave unit includes a circuit controlled from the master unit for selecting a desired frequency and converting the selected signal into an intermediate frequency. The master unit also includes a detector, a pre-amplifier and a power amplifier along with controls for adjusting the receiver.

8 Claims, 1 Drawing Sheet

STEREO APPARATUS THAT INCLUDES A MASTER UNIT AND A SLAVE UNIT

TECHNICAL FIELD

The present invention concerns an apparatus for providing sound in vehicles, comprising a receiver for radio-frequency waves with frequency selection, an antenna connected to said receiver, an operating means located in the vehicle close to the driver's seat including a power amplifier with controls for adjusting the sound volume, and loudspeakers connected to said power amplifier.

BACKGROUND OF THE INVENTION

Equipment for receiving radio waves and producing sound in vehicles generally comprise a stereo radio-cassette. The available space is very limited for the controls needed for programming the transmitter frequencies, adjusting the sound or operating the tape player. This implies that the control buttons can rarely be of an advantageously ergonomic design. The stereo radio-cassette is often completed with a CD-switcher placed in the luggage compartment of the vehicle, which requires an extra operating unit on the operating panel for controlling the CD-switcher.

The radio antenna generally has to be placed at such a long distance from the radio unit that a separate antenna amplifier is needed. It is even known to place the whole radio unit near to an antenna in the rear part of the car, e.g. as in U.S. Pat. No. 4910796, and to transmit the LF-signal to a power amplifier at the operating part in the operating panel. This then necessitates several conductors to transmit stereo signals, and also a conductor to transmit the station selection signal.

Vehicle manufacturers are also faced with a problem to integrate ever more technically complicated sound systems in the environment of the driver. Owing to the RDS-technique, the car radio is used to an ever greater extent for receiving traffic messages. A substantial problem for vehicle suppliers is that different markets, like western Europe, USA, Australia, Japan and eastern Europe, make use of different frequency bands for radio reception, and development goes a way where new digital transmission techniques also end up on different frequency bands. The costs to supply different markets with different system variants get very high. Furthermore, the costs to install these systems in a vehicle are high.

TECHNICAL PROBLEM

The purpose of the present invention is therefore to attain an apparatus for providing sound in vehicles, which simplifies the adaptation to different markets by reducing both the costs for the hardware required to offer different system variants and the installation need after the vehicle has left the assembling factory as well.

SOLUTION

For this purpose, the invention is characterized in, that said radio receiving means is divided into a master unit close to the driver's seat in the vehicle, and a slave unit which is located together with the antenna remotely from said master unit, said slave unit comprises a circuit controlled from said master unit for selecting a desired transmitter frequency and a circuit for converting the selected signal into a signal of intermediate frequency with mainly a constant frequency, and said master unit comprises a detector, a pre-amplifier and said power amplifier along with controls for adjusting the receiver.

DESCRIPTION OF THE DRAWINGS

The invention will be described herebelow with reference to the preferred embodiment which is shown on the accompanying drawings wherein FIG. 1 schematically shows a vehicle with the apparatus of the invention in a perspective view.

DESCRIPTION OF THE PREFERRED EMBODIMENTS

Figure 1:
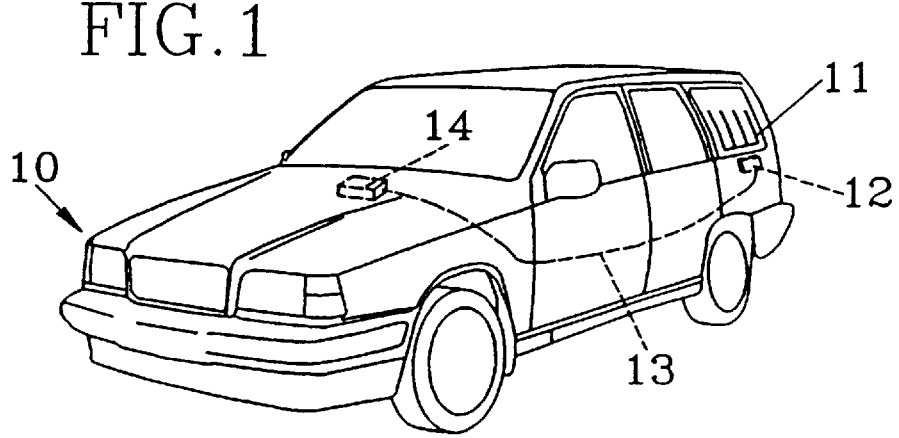

The vehicle 10 shown in FIG. 1 is equipped with a window pane antenna 11 mounted on the left rear window pane. The antenna is connected to a slave unit 12 placed relatively close to the same. This slave unit forms a radio receiving means which is in turn connected through a coaxial cable 13 to a master unit 14 placed in the vehicle close to the driver's seat with an operating panel that preferably comprises a power amplifier, a tape player and controls for adjusting the loudspeakers 15, as well as controls for programming and selecting radio channels.

Figure 2:
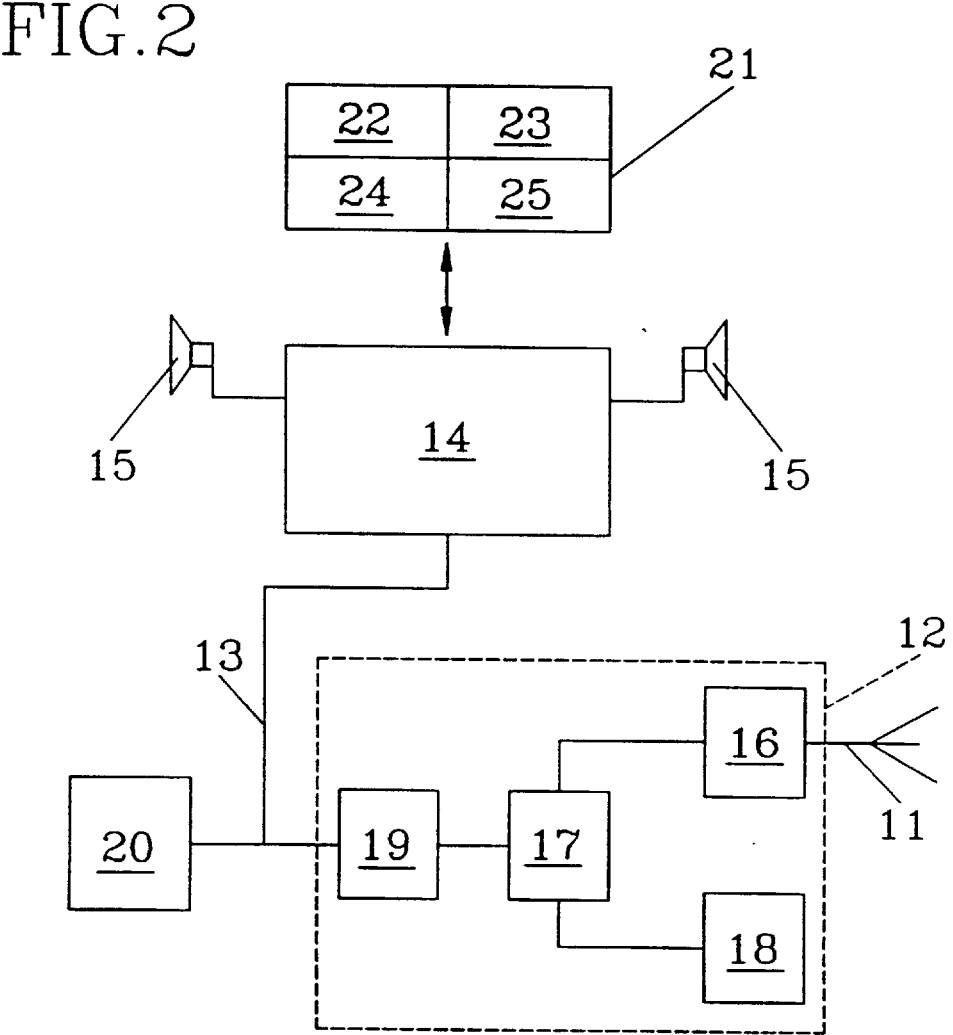
FIG. 2 is a block diagram which schematically shows a sound equipment for a vehicle designed according to the invention.

FIG. 2 shows schematically the design of the equipment. The slave unit 12 comprises a high frequency amplifying block 16 for a desired radio band even in a RDS-application, a mixer 17, an oscillator 18 and an intermediate frequency amplifier 19. The master unit 14 near by the driver's seat comprises a stereo decoder and an electronic noise suppressor as well as a pre-amplifier.

By placing the high frequency receiving block 16 near the antenna 11, an antenna cable which damps the signal is avoided, so that the need for a separate antenna amplifier disappears. The intermediate frequency, e.g. for VHF 10.7 MHz, that is transmitted between the slave unit and the master unit, is not appreciably attenuated in the coaxial cable 13. The interference distance becomes large since the signal from the intermediate frequency amplifier can be put on a level insensitive to disturbances. For AM reception, an intermediate frequency around 450 kHz is normally used. It will, contrary to the case where a long antenna cable is used and a compromise has to be done between exigences for FM or AM reception, be easy to optimize the coaxial cable impedance. Besides, the number of conductors will be less compared with a transmission of a demodulated low frequency signal in stereo.

FIG. 2 also shows a CD-switcher 20 which can be equipped with a 10.7 MHz output, so that it can be connected to the master unit 14 through the coaxial cable 13. The technique for remotely controlling the slave unit 12 and the CD-switcher 20 is already known and is based on serial data and clock pulse, to keep the number of cables low. Microprocessors for this purpose are available on the market in simple and cheap designs. By using a digital/analog converter, the signal transmission can de done directly through the coaxial cable 13.

The slave unit can be supplied in different designs for different markets. In that way, the remaining equipment can be common to all markets. This gives obvious advantages like savings despite the great variety of models, and simplifies design changes for different year or car models.

If needed, several slave units can be combined, for example a slave unit for normal RDS-reception and an other slave unit which is intended for receiving Digital Audio Broadcasting. In DAB, the digital signal can be converted in an interface to a 10.7 MHz intermediate frequency signal.

For certain markets, it may even be interesting to complete a slave unit for receiving the short wave band.

The slave unit can be mounted hidden behind some detachable panel in the luggage compartment. The slave unit assembly can be done in an easy way by the final user on the actual market, whereas all remaining equipment can be factory-assembled. The same slave units can be used for different car makes. The placing of the slave unit simplifies and reduces the costs for service and when upgrading. An exchange system can be built up, which further reduces the customer's costs. Use of a certain slave unit makes it cheaper to exchange the master unit when connecting to another sound source like Mini-Disk, DCC, DAT or CD-switcher 20.

FIG. 2, also illustrates the possibility to remotely control the master unit 14 by way of a remote control 21, which is equipped with controls such as volume control 22, function selection 23, station selection 24 and presets 25. This variant may be interesting for limousines and taxis as an example.

Same types of slave units according to the invention can be used with different systems of master units, which can be adapted to interiors and current conditions in busses, lorries and boats.

The invention is not limited to the embodiments hereinbefore described, which may be modified within the scope of the appended claims.

I claim:

1. Stereo apparatus for providing sound in vehicles comprising a receiving means for radio-frequency waves with frequency selection, an antenna connected to said receiving means, an operating means located in the vehicle close to the driver's seat including a power amplifier with controls for sound adjustment, and loudspeakers connected to said power amplifier, wherein said receiving means is divided into a master unit close to the driver's seat in the vehicle, and a slave unit which is located together with the antenna remotely from said master unit, said slave unit comprising a circuit controlled from said master unit for selecting a desired transmitter frequency signal that includes a stereo signal, a mixer, an oscillator, and a circuit including an intermediate frequency amplifier for converting the selected stereo signal into a signal of intermediate frequency with mainly a constant frequency, and said master unit comprising a detector, a stereo decoder and a pre-amplifier.

2. Stereo apparatus according to claim 1, wherein said master unit and said slave unit are equipped with a microcomputer interface for reciprocal data communication.

3. Stereo apparatus according to claim 2, wherein data communication between said master unit and said slave unit is serial.

4. Stereo apparatus according to claim 2, wherein said slave unit and said master unit are linked through a coaxial cable.

5. Stereo apparatus according to claim 1, wherein data communication between said master unit and said slave unit is serial.

6. Stereo apparatus according to claim 5, wherein said slave unit and said master unit are linked through a coaxial cable.

7. Stereo apparatus according to claim 1, wherein said slave unit and said master unit are linked through a coaxial cable.

8. Stereo apparatus according to claim 1, wherein said master unit includes connection means for connecting the master unit to other sound source.

* * * * *